Oct. 22, 1929.　　　H. H. DETWILER　　　1,732,506

DRIVE FOR SAWMILL CARRIAGES

Filed April 1, 1926　　　2 Sheets-Sheet 1

INVENTOR

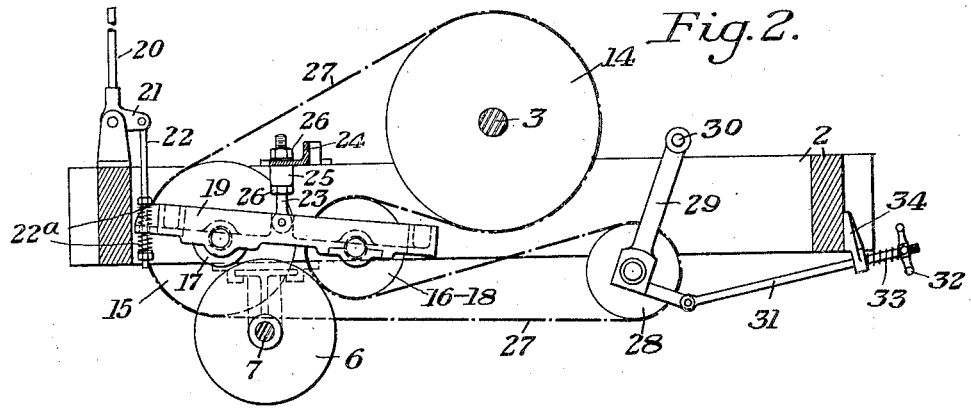
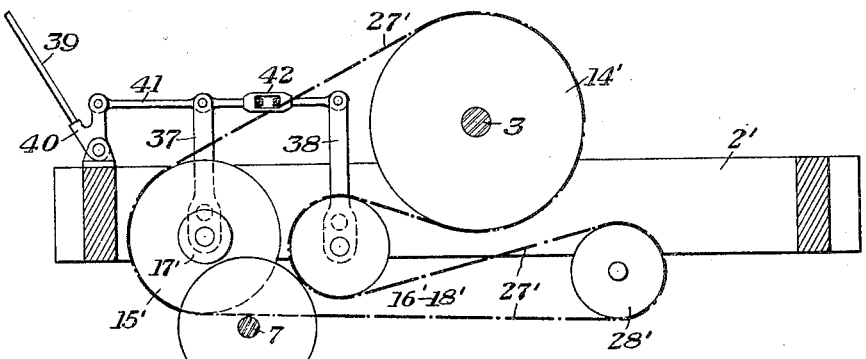
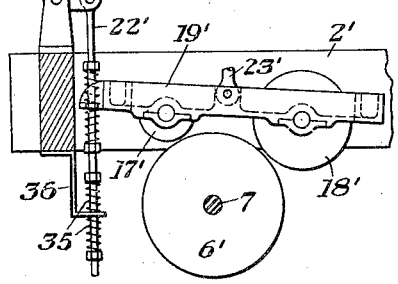

Patented Oct. 22, 1929

1,732,506

UNITED STATES PATENT OFFICE

HOMER H. DETWILER, OF COLUMBIANA, OHIO, ASSIGNOR TO THE ENTERPRISE COMPANY, OF COLUMBIANA, OHIO, A CORPORATION OF OHIO

DRIVE FOR SAWMILL CARRIAGES

Application filed April 1, 1926. Serial No. 99,051.

This invention relates to a drive for a saw mill carriage, and has particular reference to a reversible drive capable of moving a carriage at various speeds.

It is the customary practice to move the carriage of a saw mill by means of a cable and cable drum. The cable is usually wrapped around the drum an amount sufficient to obtain the required frictional pull, and the ends of the cable are attached to the carriage, suitable guide pulleys being provided as needed.

I provide an improved means for driving and controlling the cable drum, whereby it is possible to secure varying drum speeds in reverse directions. Close adjustments and ease of operation are made possible by an improved control means, wherein the friction driving elements are maintained in close proximity to the driven element, and wherein the drive automatically becomes inoperative when the control handle is released.

Heretofore the cable drum has been driven by a bull wheel whose rotation has been controlled by friction wheels bearing against the periphery of the bull wheel, the friction wheels being suitably driven from the power source operating the saw. The shafts supporting the friction drive wheel and the friction gig wheel has been carried in fixed bearings. The bull wheel has been brought to bear against the desired friction wheel, drive or gig, by reason of its shaft being guided in an eccentrically carried bearing, whereby the bull wheel was reciprocated as desired. Inasmuch as motion is ordinarily transmitted from the bull wheel to the drum by a gear and pinion, the foregoing structure was imperfect in that the pinion and gear teeth were thrown out of alignment when the bull wheel was reciprocated to operate the carriage. Furthermore, the bull wheel shaft tended to bind in the bearing. Moreover, the contact between the tilted bull wheel and the respective friction wheels was uneven, resulting in uneven wear and impairing the smooth operation of the machine.

I obviate the foregoing difficulties by mounting the bull wheel shaft in stationary bearings and moving the drive and gig friction wheels relative to the bull wheel. The latter is accomplished by carrying the friction wheels in a swinging frame, whereby it is possible to engage either friction wheel with the bull wheel without disturbing the alignment of the bull wheel shaft. In this construction, all of the transmission shafts are maintained parallel to each other, thereby assuring even contact between the bull wheel and the friction wheels, and thus a smooth control at all times. Moreover, the alignment of the pinion, on the bull wheel shaft, with the drum gear is never disturbed.

I further provide a structure wherein the driving belt is so disposed that the tension thereof is made effective for holding the friction wheels normally out of engagement with the bull wheel.

Various other advantages of my improved carriage drive will be seen by reference to the accompanying drawings, wherein there are shown certain preferred embodiments of my invention. In the drawings—

Figure 2 is a diagrammatic sectional view of the drive mechanism;

Figure 3 is a view similar to Figure 2 illustrating a modification of the friction wheel controlling means; and Figure 4 illustrates diagrammatically a preferred form of centering device, whereby the friction wheels are normally held out of engagement with the bull wheel.

Figure 1:
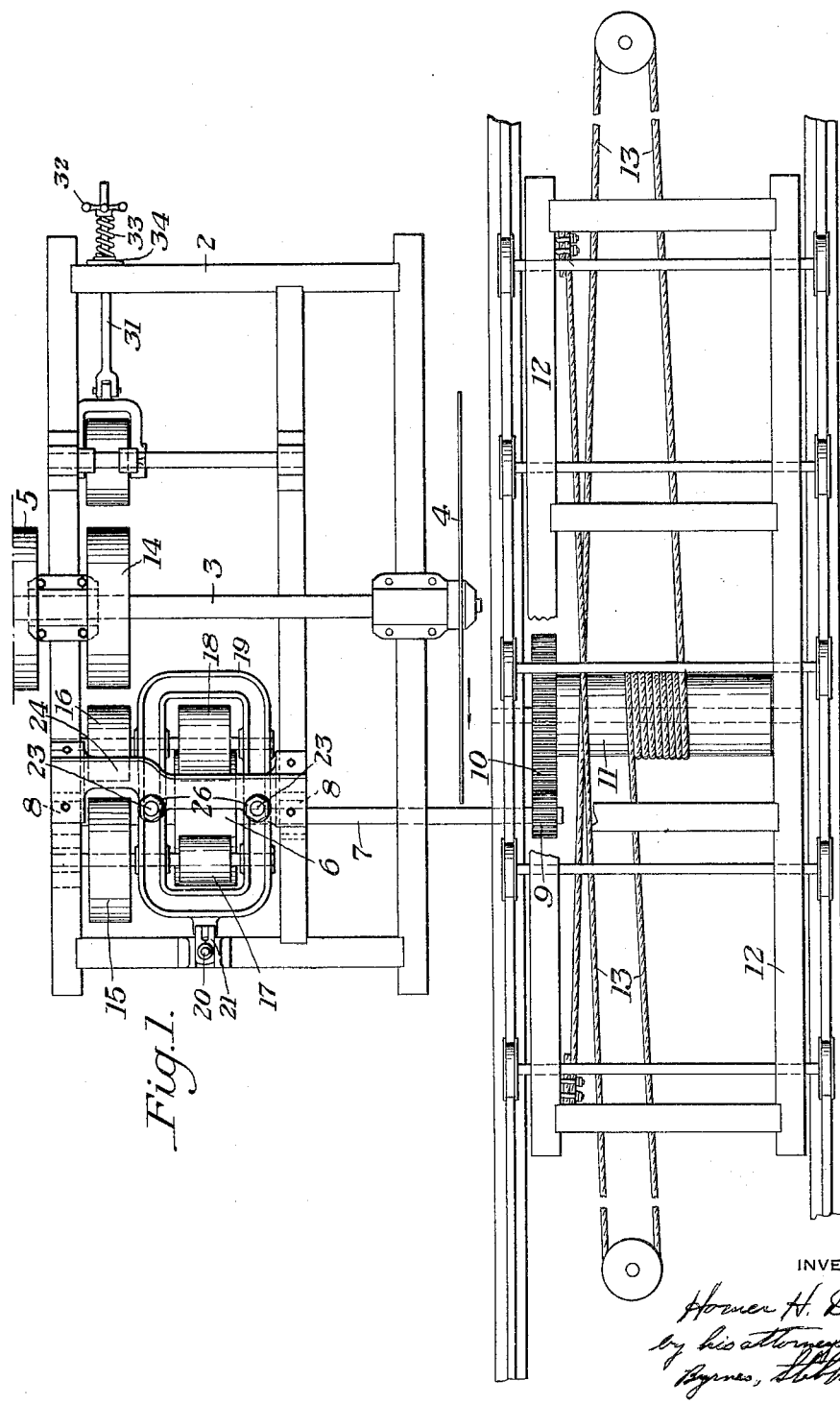
Figure 1 is a top plan view of a saw mill embodying my invention.

Referring to Figure 1, there is shown a saw mill having a frame 2 on which is mounted a main shaft 3 which acts as a carrying mandrel for a saw 4. Power is thus transmitted to the saw 4 from a pulley 5 which may be driven by any suitable source of power, such as an electric motor or a steam engine.

A bull wheel 6 is mounted on a shaft 7 held in stationary bearings 8 on the lower part of the frame 2. The bull wheel 6 drives the shaft 7, the outer end of which carries a pinion 9 which meshes with a gear 10, thereby driving a cable drum 11 which reciprocates a log carriage 12 by means of a cable 13. The carriage 12 and the cable drive are the usual type, well known to those skilled in the art.

Power for reciprocating the carriage 12 is derived from the main shaft 3 by a pulley 14 mounted thereon and belted to pulleys 15 and 16, from which power is transmitted to the bull wheel 6 by friction wheels 17 and 18. The friction wheels 17 and 18 are driven in opposite sense to each other so that the bull wheel 6 may be rotated to drive the carriage 12 forward or backward with respect to the saw 4 by simply engaging the appropriate friction wheel with the bull wheel.

I provide an improved means for controlling the power applied to the bull wheel 6, comprising essentially a swing frame 19 which carries the friction wheels 17 and 18 and their respective drive pulleys 15 and 16. The swing frame 19 is manually controlled by means of a hand lever 20 (Fig. 2) operating a bell crank 21, pivoted on the saw frame 2. A rod 22 transmits motion from the crank 21 to the swing frame 19 through cushioning springs 22$^a$ which surround the rod 22 and press against the frame 19 from above and below.

The swing frame 19 is preferably supported by adjustable posts or eye-bolts 23 which are adjustably secured to a supporting piece 24 which is fastened to the saw frame 2. The supporting piece 24 has guide collars 25 made integral therewith, whereby the eye-bolts 23 are rigidly guided. Suitable nuts 26 bearing on opposite ends of the collars 25 securely fasten the eye-bolts 23 with respect thereto, and yet permit vertical adjustment, if required, of the swing frame 19. A belt 27, engaging the pulley 14, drives the pulleys 15 and 16 (rotating the friction wheels 17 and 18) and is held tight by an idler 28 swung on a yoke 29 from a bar 30 which is fastened to the frame 2. Tension is applied to the belt by a threaded rod 31 from a hand nut 32 which adjustably compresses a spring 33 against a bracket 34 held on the frame 2.

The pull of the belt 27 is made effective for centering the frame 19, thereby rendering the friction wheels 17 and 18 normally inoperative. This desirable result is secured by locating the center of suspension of the swing frame 19 so that the tensions in the various parts of the belt, where it engages the pulleys 15 and 16, neutralize each other when the frame 19 has been swung to such position that the friction wheels 17 and 18 disengage the bull wheel 6. In locating the center of suspension of the frame 19, due regard must be paid to the variations in the belt tension occasioned by the friction load applied thereon by the various pulleys, to the various angles at which the belt leaves the various pulleys, and to the location of the pulley centers. It will thus be seen that the final location of the center of suspension of the swing frame 19 depends upon a number of factors, but all of these may be easily taken care of in any particular drive.

Inasmuch as the forward or cutting speed of the carriage 12 is somewhat slower than its return speed, the drive wheel 17 is preferably smaller than the return or gig wheel 18, and their respective driving pulleys 15 and 16 are of different sizes in the reverse sense. It will be understood that the diameters of the friction wheels and their pulleys will have a decided bearing upon the angularity of the belt and the tension thereof. Accordingly, it is sometimes difficult to obtain a normal neutral position for the swing frame 19 by belt tension alone, and for that reason I provide means whereby a neutral position of the frame 19 is assured when the hand lever 20 is released. Such a means is illustrated in Figure 4, wherein the rod 22' has been extended to accommodate centering springs 35 which cooperate with a bracket 36 attached to the frame 2'. In this modification, the centering springs 35 may be made comparatively light to compensate for a slight tendency of the frame 19 to swing out of a neutral position. On the other hand, the springs 35 may be made comparatively strong, in which case the frame 19' will be made to assume a neutral position independently of the belt tension. In any case, centering means is desirable, since the clearance between the friction wheels and the bull wheel is preferably quite small.

Figure 3 illustrates a modification of my improved drive mechanism, wherein the drive wheel 17' and gig wheel 18' are carried on levers 37 and 38 pivoted eccentrically from the friction wheel centers, the eccentricity being the same in both cases. The position of the friction wheels 17' and 18' with respect to the bull wheel 6' is manually controlled by means of a hand lever 39 which operates a bell crank 40 pivoted on the frame 2'. A rod 41 connects the bell crank 40 with the levers 37 and 38, a turn buckle 42 being interposed between the levers to provide relative adjustment therebetween. While I have not shown centering springs on this modification, it is plain that they may be applied to the rod 41 in a manner similar to the application on rod 22 in Figure 2, if desired. Likewise, the spring combination disclosed in Figure 4 is also applicable to the rod 41.

I thus provide an improved saw mill feed mechanism wherein the bull wheel is held in fixed bearings and the cable drum gearing is maintained in fixed alignment during the operation of the carriage.

Further advantages accrue to my structure by reason of the provision of drive and gig friction wheels whose shafts are maintained parallel to the bull wheel shaft during the entire operation of the drive, thereby assuring even contact between the friction wheels and the bull wheel and resulting in even wearing of the transmission elements. This result is obtained by a structure wherein the drive and gig friction wheels are movable relatively to the bull wheel.

In order that the drive and gig friction wheels may be simultaneously moved relatively to the bull wheel, I have provided a structure wherein the friction wheels are linked together and the linkage controlled by a hand lever.

The invention is further characterized by such arrangement of the pulley centers and the center of oscillation of the friction wheels that the belt tension is made effective for normally maintaining the friction wheels in substantially neutral position. In addition to this, I have set forth mechanical means for centering the friction wheels in neutral position, said means being usable in conjunction with the arrangement above set forth, or independently thereof. In either case, ease of operation is assured, since the operators will not have to trouble with a locking device to hold the drive in neutral position.

While I have described the present preferred embodiment of my invention, it will be understood that various arrangements may be used for moving the friction wheels relative to the bull wheel, and other embodiments employed, without departing from the spirit of the invention or the scope of the following claims.

I claim:

1. In an apparatus of the class described, a bull wheel, drive and gig friction wheels therefor, a driving belt operatively connected to the friction wheels, and a movable frame carrying the friction wheels and maintained in substantially neutral position by the tension of the driving belt.

2. In an apparatus of the class described, a bull wheel, drive and gig friction wheels therefor, pulleys connected in the friction wheels and effective for rotating the same, a driving belt engaging the pulleys, and a tiltable frame carrying the friction wheels and pulleys and maintained in substantially neutral position by the tension of the driving belt.

3. In an apparatus of the class described, a bull wheel, drive and gig friction wheels therefor, pulleys connected to the friction wheels and effective for rotating the same, a driving belt engaging the pulleys, a manually tiltable frame carrying the friction wheels and pulleys and maintained in substantially neutral position by the tension of the driving belt, and means normally urging the frame into a position where the friction wheels are held in inoperative position.

4. In an apparatus of the class described, a bull wheel, drive and gig friction wheels therefor, pulleys connected to the friction wheels and effective for rotating the same, a driving belt engaging the pulleys, a manually tiltable frame carrying the friction wheels and pulleys and maintained in substantially neutral position by the tension of the driving belt, means normally centering the frame whereby the friction wheels are held in inoperative position, and means for adjusting the tension of the driving belt.

5. In an apparatus of the class described, a bull wheel, drive and gig friction wheels therefor, pulleys connected to the friction wheels and effective for rotating the same, a driving belt engaging the pulleys, a manually tiltable frame carrying the friction wheels and pulleys and maintained in substantially neutral position by the tension of the driving belt, adjustable frame supporting means, means normally centering the frame whereby the friction wheels are held in inoperative position, and means for adjusting the tension of the driving belt.

In testimony whereof I have hereunto set my hand.

HOMER H. DETWILER.